(12) United States Patent
Hong et al.

(10) Patent No.: US 12,032,699 B2
(45) Date of Patent: Jul. 9, 2024

(54) STORAGE DEVICE AND METHOD OF OPERATING THE SAME

(71) Applicant: SAMSUNG ELECTRONICS CO., LTD., Suwon-si (KR)

(72) Inventors: Seok Gi Hong, Suwon-si (KR); Myeong Jong Lee, Seoul (KR); Sung Ho Yoon, Hwaseong-si (KR); Seong Chan Jo, Dangjin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/857,387

(22) Filed: Jul. 5, 2022

(65) Prior Publication Data

US 2023/0143189 A1    May 11, 2023

(30) Foreign Application Priority Data

Nov. 8, 2021  (KR) .................. 10-2021-0152346
Jan. 5, 2022  (KR) .................. 10-2022-0001605

(51) Int. Cl.
| | | |
|---|---|---|
| *H04L 9/32* | (2006.01) | |
| *G06F 21/57* | (2013.01) | |
| *G06F 21/60* | (2013.01) | |

(52) U.S. Cl.
CPC .......... *G06F 21/572* (2013.01); *G06F 21/602* (2013.01); *H04L 9/3236* (2013.01)

(58) Field of Classification Search
CPC ..... G06F 21/572; G06F 21/602; H04L 9/3236

USPC ........................................................ 713/189
See application file for complete search history.

(56) References Cited

U.S. PATENT DOCUMENTS

| | | | |
|---|---|---|---|
| 8,954,694 B2 | 2/2015 | Tomlin et al. | |
| 9,459,857 B2 | 10/2016 | Gerhart et al. | |
| 9,639,434 B2* | 5/2017 | Chow ................. | G06F 11/1471 |
| 10,810,015 B2 | 10/2020 | Potlapally et al. | |
| 2012/0303974 A1 | 11/2012 | Lin et al. | |
| 2021/0279068 A1* | 9/2021 | Takanashi ............... | G06F 12/10 |
| 2022/0398321 A1* | 12/2022 | Baldwin ............... | G06F 21/645 |

FOREIGN PATENT DOCUMENTS

KR    1020140143015 A    12/2014

* cited by examiner

*Primary Examiner* — Badrinarayanan
(74) *Attorney, Agent, or Firm* — Sughrue Mion, PLLC

(57) ABSTRACT

A storage device and an operating method are provided. The storage device includes a non-volatile memory comprising a first area configured to store a plurality of normal firmware images and a second area configured to store a plurality of trusted firmware images, a firmware table configured to store information about the plurality of normal firmware images and the plurality of trusted firmware images, and a storage controller configured to control the non-volatile memory, perform a self-test for the storage device and write at least one of the plurality of trusted firmware images over a boot image based on a result of the self-test. The firmware table is configured to store a first hash value calculated before encryption of the plurality of trusted firmware images, and a second hash value calculated after encryption of the plurality of trusted firmware images.

19 Claims, 11 Drawing Sheets

FIG. 3

FWT

| FW# | HASH | EHASH | TBIT | BOOT PRIORITY |
|---|---|---|---|---|
| 1 | a1 | a2 | 1 | 2 |
| 2 | b1 | b2 | 1 | 3 |
| 3 | c1 | c2 | 1 | 6 |
| ⋮ | ⋮ | ⋮ | ⋮ | ⋮ |
| 1 | d1 | 0 | 0 | 1 |
| 2 | e1 | 0 | 0 | 4 |
| 3 | f1 | 0 | 0 | 5 |
| ⋮ | ⋮ | ⋮ | ⋮ | ⋮ |

FIG. 10

FWT

| FW# | HASH | EHASH | TBIT | BOOT PRIORITY |
|---|---|---|---|---|
| 1 | a1 | a2 | 1 | ~~2~~ 1 |
| 2 | b1 | b2 | 1 | 3 |
| 3 | c1 | c2 | 1 | 6 |
| ⋮ | ⋮ | ⋮ | ⋮ | ⋮ |
| 1 | d1 | 0 | 0 | ~~1~~ 2 |
| 2 | e1 | 0 | 0 | 4 |
| 3 | f1 | 0 | 0 | 5 |
| ⋮ | ⋮ | ⋮ | ⋮ | ⋮ |

STORAGE DEVICE AND METHOD OF OPERATING THE SAME

CROSS-REFERENCE TO RELATED APPLICATION(S)

This application is based on and claims priority to Korean Patent Application No. 10-2022-0001605, filed on Jan. 5, 2022, in the Korean Intellectual Property Office, and Korean Patent Application No. 10-2021-0152346, filed on Nov. 8, 2021, in the Korean Intellectual Property Office, the disclosures of which are incorporated herein in their entireties by reference.

BACKGROUND

1. Field

The disclosure relates generally to a storage device and an operating method thereof.

2. Description of the Related Art

Firmware is used by selecting it from a storage device in which several pieces of firmware are stored in firmware slots. A firmware selection process may be performed by, for example, a host device, and in this case, the storage device may be operated with ineffective firmware selected because the host device is not capable of accurately identifying an internal circumstance of the storage device.

SUMMARY

Provided are a storage device having improved operation reliability and an operating method thereof.

Additional aspects will be set forth in part in the description which follows and, in part, will be apparent from the description, or may be learned by practice of the presented embodiments.

In accordance with an aspect of an example embodiment of the disclosure, a storage device for storing data may include a non-volatile memory including a first area configured to store a plurality of normal firmware images and a second area configured to store a plurality of trusted firmware images, a firmware table configured to store information about the plurality of normal firmware images and the plurality of trusted firmware images, and a storage controller configured to control the non-volatile memory, perform a self-test for the storage device and write at least one of the plurality of trusted firmware images over a boot image based on a result of the self-test. The firmware table may be configured to store a first hash value calculated before encryption of the plurality of trusted firmware images, and a second hash value calculated after encryption of the plurality of trusted firmware images.

In accordance with an aspect of an example embodiment of the disclosure, an operating method of a storage device may include providing a firmware table storing boot priority, a first hash value, and a second hash value for a plurality of trusted firmware images, performing a self-test for the storage device, based on a result of the self-test indicating that an error is detected, changing a boot priority of a first trusted firmware image, among the plurality of trusted firmware images, for fixing the error, loading the first trusted firmware image stored in a non-volatile memory, the first trusted firmware image being encrypted, performing a first verification to determine whether a calculated third hash value of the encrypted first trusted firmware image is the same as the first hash value, decrypting the encrypted first trusted firmware image based on the first verification succeeding, performing a second verification to determine whether a calculated fourth hash value of the decrypted first trusted firmware image is the same as the second hash value, and writing the decrypted first trusted firmware image over a boot image based on the second verification succeeding.

In accordance with an aspect of an example embodiment of the disclosure, an operating method of a storage device may include authenticating a host device, receiving a firmware image from the host device based on the authentication of the host device succeeding, identifying whether the received firmware image is a normal firmware image or a trusted firmware image, based on the received firmware image being a normal firmware image, calculating a first hash value of the received firmware image, storing the first hash value in a firmware table, storing the normal firmware image in a non-volatile memory, and, based on the received firmware image being a trusted firmware image, calculating a second hash value of the received firmware image, encrypting the trusted firmware image, calculating a third hash value of the encrypted trusted firmware image, storing the second hash value and the third hash value in the firmware table, and storing the encrypted trusted firmware image in the non-volatile memory.

It should be noted that objects of the present disclosure are not limited thereto and other objects of the present disclosure will be apparent to those skilled in the art from the following descriptions.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating a firmware table according to an embodiment;

FIGS. 9, 10 and 11 are diagrams of an operating method of a storage device according to an embodiment.

DETAILED DESCRIPTION

Hereinafter, embodiments of the present disclosure will be described with reference to the accompanying drawings. The embodiments described herein are example embodiments, and thus, the disclosure is not limited thereto and may be realized in various other forms. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
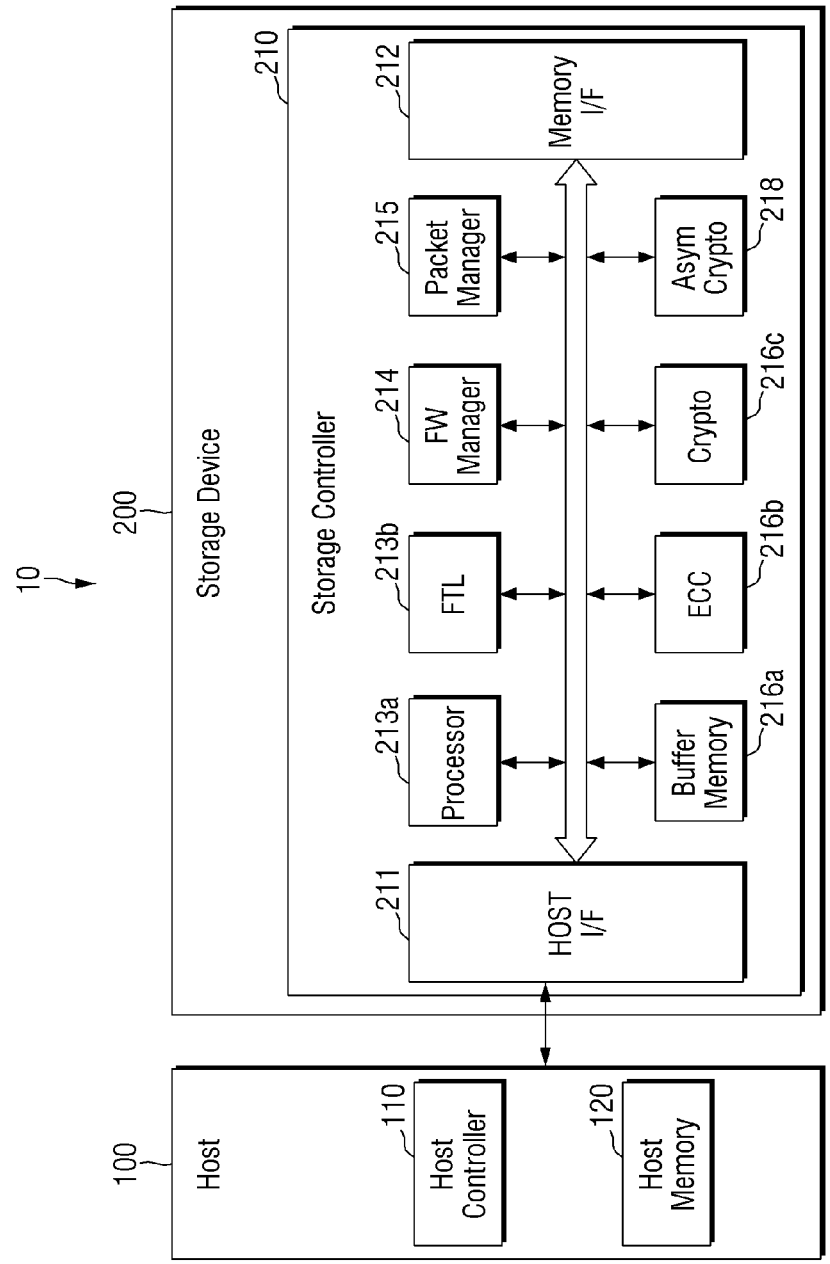
FIG. 1 is a block diagram of a storage system according to an embodiment.
Figure 2:
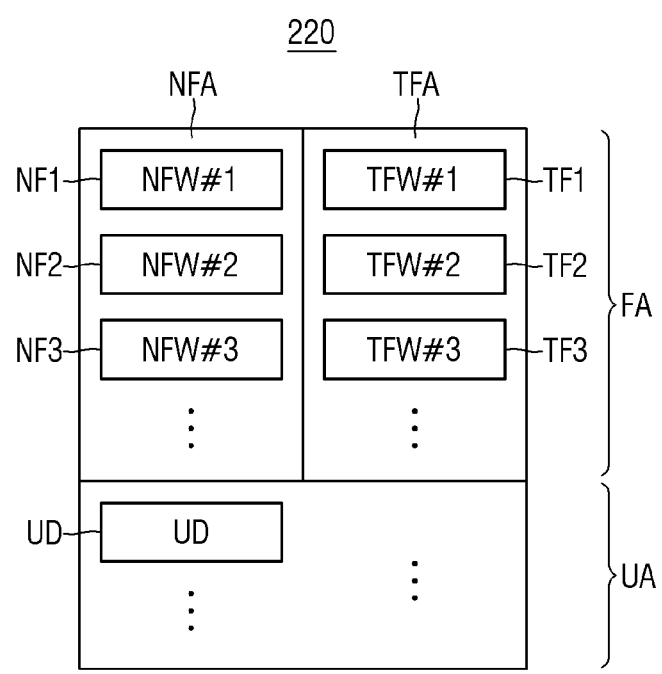
FIG. 2 is a diagram illustrating a non-volatile memory of FIG. 1 according to an embodiment.

FIG. 1 is a block diagram of a storage system according to an embodiment. FIG. 2 is a diagram illustrating a non-volatile memory (NVM) of FIG. 1 according to an embodiment. FIG. 3 is a diagram illustrating a firmware table according to an embodiment.

Referring to FIG. 1, a storage system 10 may include a host device 100 and a storage device 200. The storage device 200 may include a storage controller 210 and an NVM 220. The host device 100 may include a host controller 110 and a host memory 120. The host memory 120 may function as a buffer memory for temporarily storing data to be transmitted to the storage device 200 or data transmitted from the storage device 200.

The storage device 200 may include storage media for storing data according to a request from the host device 100. For example, the storage device 200 may include at least one of a solid-state drive (SSD), an embedded memory, and a removable external memory. When the storage device 200 is an SSD, the storage device 200 may be a device conforming to the non-volatile memory express (NVMe) standard.

When the storage device 200 is an embedded memory or an external memory, the storage device 200 may be a device conforming to the universal flash storage (UFS) or embedded multi-media card (eMMC) standard. The host device 100 and the storage device 200 may be each capable of generating and transmitting a packet according to an employed standard protocol.

When the NVM 220 of the storage device 200 includes a flash memory, the flash memory may include a two-dimensional (2D) NAND memory array or a three-dimensional (3D) (or vertical) NAND (VNAND) memory array. As another example, the storage device 200 may include various other types of NVMs. Examples of the storage device 200 may include a magnetic random access memory (MRAM), a spin-transfer torque MRAM, a conductive bridging RAM (CBRAM), a ferroelectric RAM (FeRAM), a phase RAM (PRAM), a resistive RAM, and various other types of memories.

In some embodiments, the host controller 110 and the host memory 120 may be embodied as separate semiconductor chips. In some embodiments, the host controller 110 and the host memory 120 may be integrated on the same semiconductor chip. For example, the host controller 110 may be one of a plurality of modules included in an application processor, and the application processor may be embodied as a system-on-chip (SoC). The host memory 120 may be either an embedded memory inside the application processor or an NVM or a memory module outside the application processor.

The host controller 110 may control storing of data (e.g., write data) of a buffer region in the NVM 20 or storing of data (e.g., read data) of the NVM 220 in the buffer region.

The storage controller 210 may include a host interface 211 and a memory interface 212. The storage controller 210 may further include a processor 213a, a flash translation layer (FTL) 213b, a firmware manager 214, a packet manager 215, a buffer memory 216a, an error correction code (ECC) engine 216b, a crypto engine 216c, an asymmetric crypto module 218, and the like.

The storage controller 210 may further include a working memory into which the FTL 213b is loaded, and the processor 213a may execute the FTL 213b to control a data write operation and a data read operation with respect to the NVM 220.

The host interface 211 may transmit or receive a packet to or from the host device 100. A packet transmitted from the host device 100 to the host interface 211 may include a command or data to be written to the NVM 220, and a packet transmitted from the host interface 211 to the host device 100 may include a response to a command or data read from the NVM 220.

The memory interface 212 may transmit data, which is to be written to the NVM 220, to the NVM 220 or may receive data read from the NVM 220. The memory interface 212 may be implemented to comply with standard conventions such as Toggle or ONFI.

The FTL 213b may perform various functions such as address mapping, wear-leveling, and garbage collection. Address mapping may refer to an operation of converting a logical address received from a host into a physical address to be used to actually store data in the NVM 220.

Wear-leveling may refer to a technology for allowing blocks included in the NVM 220 to be evenly used, thereby preventing excessive deterioration of a certain block, and may be implemented, for example, by firmware technology for balancing erase counts of physical blocks. Garbage collection may refer to a technology for securing usable capacity in the NVM 220 by copying valid data of a block to a new block and erasing the block.

The firmware manager 214 may manage firmware operated by the storage device 200. For example, the firmware manager 214 may manage the firmware table FWT shown in FIG. 3 to manage firmware stored in the NVM 220 shown in FIG. 2. The firmware manager 214 may be implemented as a hardware component in some embodiments and implemented as software in some embodiments.

Referring to FIG. 2, the NVM 220 may include a firmware area FA storing firmware images and a user data area UA storing user data.

The user data area UA may store user data UD provided from the host device 100. In some embodiments, the user data UD may be encrypted by the crypto module 216c of FIG. 1 and then stored.

The firmware area FA may include a normal firmware storage area NFA storing normal firmware images NF1 to NF3 and a trusted firmware storage area TFA storing trusted firmware images TF1 to TF3.

In some embodiments, trusted firmware images may include a DRAM-less firmware image for operating the storage device 200 without using the buffer memory 126a of FIG. 1 when an error occurs in an operation of the buffer memory 216a of FIG. 1, which is a DRAM to be described below. In some embodiments, trusted firmware images may include a software crypto firmware image for operating the storage device 200 while operating the crypto module 216c of FIG. 1 using software, when an error occurs in the crypto module 216c of FIG. 1 to be described below.

In some embodiments, the normal firmware images NF1 to NF3 may be stored in an unencrypted state, and the trusted firmware images TF1 to TF3 may be stored in an encrypted state using unique information of the storage device 200 such as a physical unclonable function (PUF) and a one-time password (OTP). The encrypted trusted firmware images TF1 to TF3 may be decrypted using the unique information of the storage device 200 when executed by the storage controller 210 of FIG. 1. In some embodiments, the firmware manager 214 may perform such an encryption operation and decryption operation.

Referring to FIGS. 2 and 3, the firmware table FWT may store information about the firmware stored in the NVM 220. In some embodiments, the firmware table FWT may be stored in the NVM 220 of FIG. 1. In some embodiments, the firmware table FWT may be stored in a storage area of the storage controller 210.

The firmware table FWT may include a first hash value HASH, a second hash value EHASH, an identifier bit TBIT, and boot priority.

The identifier bit TBIT is a bit indicating whether a firmware image stored in the NVM 220 is a normal firmware image or a trusted firmware image. For example, the firmware image may be a trusted firmware image when the identifier bit TBIT is 1 and may be a normal firmware image when the identifier bit TBIT is 0.

In the example shown in FIG. 3, three firmware images FW #1, 2, 3 at upper positions may correspond to the trusted firmware images TF1 to TF3 of FIG. 2, and three firmware images FW #1, 2, 3 at lower positions may correspond to the normal firmware images NF1 to NF3 of FIG. 2.

The firmware manager 214 may perform the decryption operation on a firmware image to be loaded when an identifier bit TBIT of the firmware image is 1, and may not perform the decryption operation on the firmware image when the identifier bit TBIT is 0.

The first hash value HASH is a hash value calculated for unencrypted firmware images. The second hash value EHASH is a hash value calculated for encrypted firmware images.

In some embodiments, the trusted firmware images TF1 to TF3 are encrypted and stored in the NVM 220 and thus have the first hash value HASH and the second hash value EHASH. In contrast, the normal firmware images NF1 to NF3 are stored in the NVM 220 without being encrypted and thus have the first hash value HASH and do not have the second hash value EHASH.

The boot priority represents execution priority when the storage device 200 is booted. In the example of FIG. 3, the normal firmware image NF1 is set to be executed first when the storage device 200 is booted. That is, when the storage device 200 is booted, the normal firmware image NF1 is set to be written over a boot image.

The operation of the firmware manager 214 will be described in detail below.

Referring back to FIG. 1, the packet manager 215 may generate a packet according to an interface protocol determined with the host device 100 or parse various types of information from a packet received from the host device 100.

The buffer memory 216a may temporarily store data to be written to the NVM 220 or data read from the NVM 220. The buffer memory 216a may be included in the storage controller 210 or may be provided outside the storage controller 210 according to an embodiment.

The ECC engine 216b may perform an error detection and correction function on data read from the NVM 220. For example, the ECC engine 216b may generate parity bits for write data to be written to the NVM 220, and the parity bits may be stored in the NVM 220, together with the write data. When data is read from the NVM 220, the ECC engine 216b may correct an error in the read data using the parity bits read from the NVM 220 together with the read data, and output error-corrected read data.

The crypto engine 216c may perform at least one of an encryption operation and a decryption operation on data to be input to the storage controller 210 using a symmetric-key algorithm. In some embodiments, the crypto engine 216c may include, for example, an advanced encryption standard (AES) engine, but the embodiments are not limited thereto.

The crypto engine 216c may encrypt data provided from the host device 100. The data encrypted by the crypto engine 216c may be stored in the form of user data UD in the user data area UA of the NVM 220.

The crypto engine 216c may decrypt the user data UD stored in the user data area UA of the NVM 220. The data decrypted by the crypto engine 216c may be transmitted to the host device 100.

The asymmetric crypto module 218 may perform an asymmetric encryption operation using an asymmetric-key algorithm. An operation of the asymmetric crypto module 218 may be different from that of the crypto engine 216c that performs the encryption operation using a symmetric key algorithm.

A private key generated in the storage device 200 may be stored in the asymmetric crypto module 218 and used in an encryption operation of the asymmetric crypto module 218.

Figure 4:
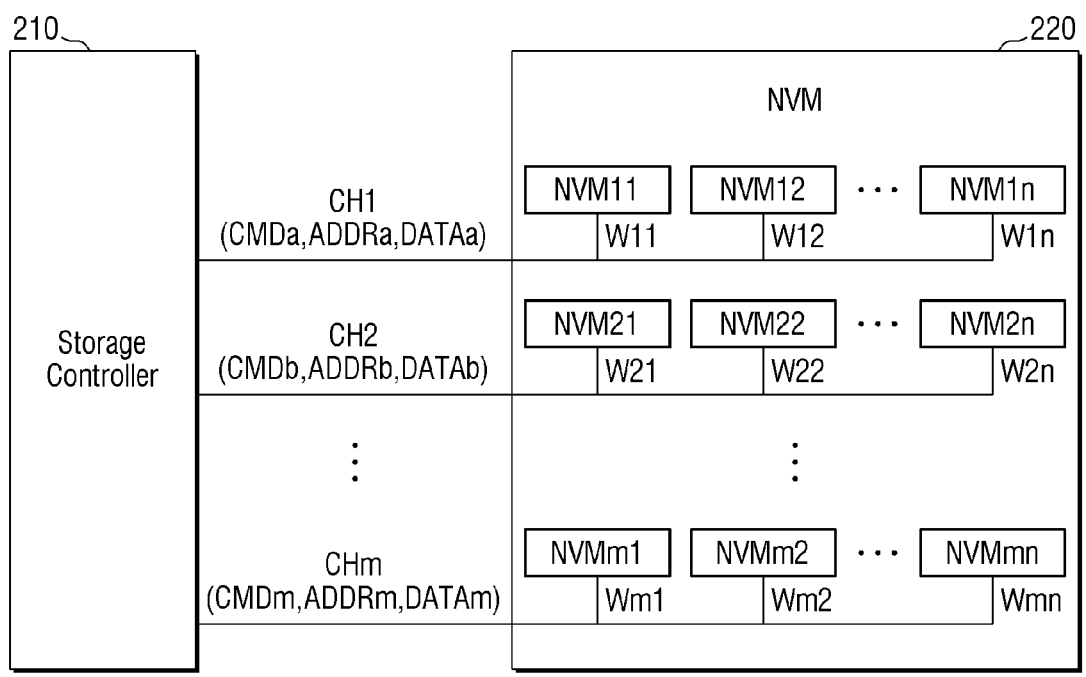
FIG. 4 is a diagram illustrating a result of reconstructing a storage controller of a storage device and the non-volatile memory shown in FIG. 1 according to an embodiment.

FIG. 4 is a diagram illustrating a result of reconstructing the storage controller 210 of the storage device 200 and the NVM 220 shown in FIG. 1 according to an embodiment.

Referring to FIG. 4, the storage device 200 may include an NVM 220 and a storage controller 210. The storage device 200 may support a plurality of channels CH1 to CHm, and the NVM 220 and the storage controller 210 may be connected through the plurality of channels CH1 to CHm. For example, the storage device 200 may be embodied as a storage device such as an SSD.

The NVM 220 may include a plurality of NVM devices NVM11 to NVMmn.

Each of the NVM devices NVM11 to NVMmn may be connected to one of the plurality of channels CH1 to CHm through a corresponding way. For example, the NVM devices NVM11 to NVM1n may be connected to the first channel CH1 through ways W11 to W1n, and the NVM devices NVM21 to NVM2n may be connected to the second channel CH2 through ways W21 to W2n. In an embodiment, each of the NVM devices NVM11 to NVMmn may be embodied as a memory unit capable of operating according to an individual command from the storage controller 210. For example, each of the NVM devices NVM11 to NVMmn may be embodied as a chip or a die but the present disclosure is not limited thereto.

The storage controller 210 may transmit and receive signals to and from the NVM 220 through the plurality of channels CH1 to CHm. For example, the storage controller 210 may transmit commands CMDa to CMDm, addresses ADDRa to ADDRm, and data DATAa to DATAm to the NVM 220 or receive the data DATAa to DATAm from the NVM 220 through the channels CH1 to CHm.

The storage controller 210 may select one of the NVM devices connected to the channels through a corresponding channel and transmit and receive signals to and from the selected NVM device. For example, the storage controller 210 may select the NVM device NVM11 from among the NVM devices NVM11 to NVM1N connected to the first channel CH1. The storage controller 210 may transmit the command CMDa, the address ADDRa, and the data DATAa to the selected NVM device NVM11 or receive the data DATAa from the selected NVM device NVM11 through the first channel CH1.

The storage controller 210 may transmit and receive signals to and from the NVM 220 in parallel through different channels. For example, the storage controller 210 may transmit the command CMDb to the NVM 220 through the second channel CH2 while transmitting the command CMDa to the NVM 220 through the first channel CH1. For example, the storage controller 210 may receive the data DATAb from the NVM 220 through the second channel CH2 while receiving the data DATAa from the NVM 220 through the first channel CH1.

The storage controller 210 may control overall operations of the NVM 220. The storage controller 210 may control the NVM devices NVM11 to NVMmn connected to the channels CH1 to CHm by transmitting a signal to the channels CH1 to CHm. For example, the storage controller 210 may transmit the command CMDa and the address ADDRa to the first channel CH1 to control an NVM device selected from among the NVM devices NVM11 to NVM1N.

Each of the NVM devices NVM11 to NVMmn may be operated under control of the storage controller 210. For example, the NVM device NVM11 may program (or write) the data DATAa according to the command CMDa, the address ADDRa, and the data DATAa provided through the first channel CH1. For example, the NVM device NVM21 may read the data DATAb according to the command CMDb and the address ADDRb that are provided through the second channel CH2, and transmit the read data DATAb to the storage controller 210.

FIG. 4 illustrates that the NVM 220 communicates with the storage controller 210 through m channels and the NVM 220 includes n NVM devices corresponding to the channels, but the number of channels and the number of NVM devices connected to one channel may be changed variously.

Figure 5:
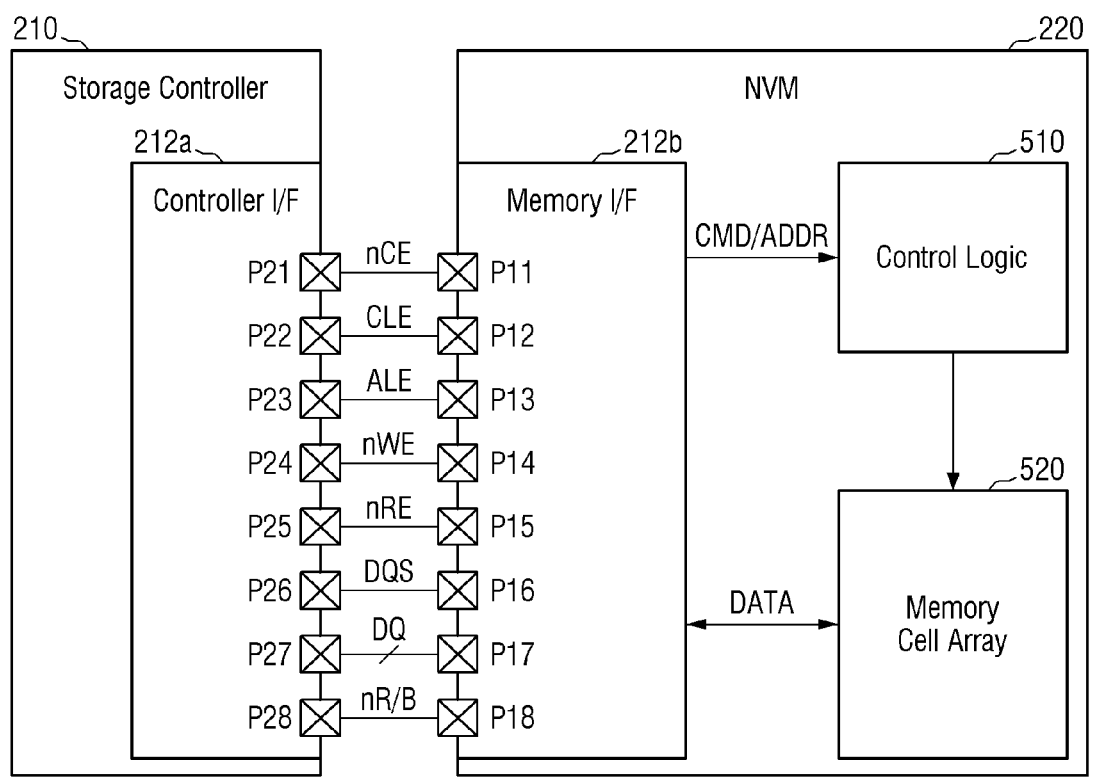
FIG. 5 is a diagram illustrating a result of reconstructing the storage controller, a memory interface, and the non-volatile memory of FIG. 1 according to an embodiment.

FIG. 5 is a diagram illustrating a result of reconstructing the storage controller 210, the memory interface 212, and the NVM 220 of FIG. 1 according to an embodiment. The memory interface 212 of FIG. 1 may include a controller interface circuit 212a of FIG. 5.

The NVM 220 may include first to eighth pins P11 to P18, a memory interface circuit 212b, a control logic circuit 510, and a memory cell array 520.

The memory interface circuit 212b may receive a chip enable signal nCE from the storage controller 210 through the first pin P11. The memory interface circuit 212b may transmit and receive signals to and from the storage controller 210 through the second to eighth pins P12 to P18 according to the chip enable signal nCE. For example, when the chip enable signal nCE is in an enabled state (for example, a low level), the memory interface circuit 212b may transmit and receive signals to and from the storage controller 210 through the second to eighth pins P12 to P18.

The memory interface circuit 212b may receive a command latch enable signal CLE, an address latch enable signal ALE, and a write enable signal nWE from the storage controller 210 through the second to fourth pins P12 to P14. The memory interface circuit 212b may receive a data signal DQ from the storage controller 210 or transmit the data signal DQ to the storage controller 210 through the seventh pin P17. A command CMD, an address ADDR, and data DATA may be transmitted through the data signal DQ. For example, the data signal DQ may be transmitted through a plurality of data signal lines. In this case, the seventh pin P17 may include a plurality of pins corresponding to a plurality of data signals.

The memory interface circuit 212b may receive the command CMD from the data signal DQ received in an enable section (e.g., at a high-level state) of the command latch enable signal CLE on the basis of toggle timings of the write enable signal nWE. The memory interface circuit 212b may obtain the address ADDR from the data signal DQ received in an enable section (e.g., at a high-level state) of the address latch enable signal ALE on the basis of the toggle timings of the write enable signal nWE.

In some embodiments, the write enable signal nWE may be maintained in a static state (e.g., a high level or a low level) and thereafter be toggled between the high level and the low level. For example, the write enable signal nWE may be toggled in a section in which the command CMD or the address ADDR is transmitted. Accordingly, the memory interface circuit 212b may obtain the command CMD or the address ADDR on the basis of the toggle timings of the write enable signal nWE.

The memory interface circuit 212b may receive a read enable signal nRE from the storage controller 210 through the fifth pin P15. The memory interface circuit 212b may receive a data strobe signal DQS from the storage controller 210 or transmit the data strobe signal DQS to the storage controller 210 through the sixth pin P16.

In a data DATA output operation of the NVM 220, the memory interface circuit 212b may receive the read enable signal nRE, which is toggling, through the fifth pin P15 before outputting the data DATA. The memory interface circuit 212b may generate a data strobe signal DQS, which is toggling, on the basis of toggling of the read enable signal nRE. For example, the memory interface circuit 212b may generate the data strobe signal DQS that starts toggling after a predetermined delay time (e.g., tDQSRE) from a toggling start time of the read enable signal nRE. The memory interface circuit 212b may transmit the data signal DQ including the data DATA on the basis of a toggle timing of the data strobe signal DQS. Accordingly, the data DATA may be aligned with the toggle timing of the data strobe signal DQS and transmitted to the storage controller 210.

In a data DATA input operation of the NVM 220, when the data signal DQ including the data DATA is received from the storage controller 210, the memory interface circuit 212b may receive the data strobe signal DQS, which toggles along with the data DATA, from the storage controller 210. The memory interface circuit 212b may obtain the data DATA from the data signal DQ on the basis of the toggle timing of the data strobe signal DQS. For example, the memory interface circuit 212b may obtain the data DATA by sampling the data signal DQ at a rising edge and a falling edge of the data strobe signal DQS.

The memory interface circuit 212b may transmit a ready/busy output signal nR/B to the storage controller 210 through the eighth pin P18. The memory interface circuit 212b may transmit state information of the NVM 220 to the storage controller 210 through the ready/busy output signal nR/B. When the NVM 220 is in a busy state (i.e., when internal operations of the NVM 220 are being performed), the memory interface circuit 212b may transmit the ready/busy output signal nR/B indicating the busy state to the storage controller 210. When the NVM 220 is in a ready state (i.e., when the internal operations of the NVM 220 are not being performed or are completed), the memory interface circuit 212b may transmit the ready/busy output signal nR/B indicating the ready state to the storage controller 210.

For example, while the NVM 220 reads the data DATA from the memory cell array 520 in response to a page read command, the memory interface circuit 212b may transmit the ready/busy output signal nR/B indicating the busy state (e.g., a low level) to the storage controller 210. For example, while the NVM 220 is programming the data DATA to the memory cell array 520 in response to a program command, the memory interface circuit 212b may transmit the ready/busy output signal nR/B indicating the busy state to the storage controller 210.

The control logic circuit 510 may generally control various operations of the NVM 220. The control logic circuit 512 may receive the command CMD/address ADDR from the memory interface circuit 212b. The control logic circuit 510 may generate control signals for controlling other components of the NVM 220 according to the received command CMD/address ADDR. For example, the control logic circuit 510 may generate various control signals for programming the data DATA to the memory cell array 520 or reading the data DATA from the memory cell array 520.

The memory cell array 520 may store the data DATA obtained from the memory interface circuit 212b under control of the control logic circuit 510. The memory cell array 520 may output the stored data DATA to the memory interface circuit 212b under control of the control logic circuit 510.

The memory cell array 520 may include a plurality of memory cells. For example, the plurality of memory cells may be flash memory cells. However, the present disclosure is not limited thereto, and the memory cells may include resistive random-access memory (RRAM) cells, ferroelectric RAM (FRAM) cells, PRAM cells, thyristor RAM (TRAM) cells, and MRAM cells. Embodiments of the present disclosure will be described below with respect to embodiments in which the memory cells are NAND flash memory cells.

The storage controller 210 may include first to eighth pins P21 to P28 and a controller interface circuit 212a. The first to eighth pins P21 to P28 may correspond to the first to eight pins P11 to P18 of the NVM 220.

The controller interface circuit 212a may transmit the chip enable signal nCE to the NVM 220 through the first pin P21. The controller interface circuit 212a may transmit and receive signals to and from the NVM 220, which is selected by the chip enable signal nCE, through the second to eighth pins P22 to P28.

The controller interface circuit 212a may transmit the command latch enable signal CLE, the address latch enable signal ALE, and the write enable signal nWE to the NVM 220 through the second to fourth pins P22 to P24. The controller interface circuit 212a may transmit the data signal DQ to the NVM 220 or receive the data signal DQ from the NVM 220 through the seventh pin P27.

The controller interface circuit 212a may transmit the data signal DQ including the command CMD or the address ADDR to the NVM 220, together with the write enable signal nWE that toggles. The controller interface circuit 212a may transmit the command latch enable signal CLE, which is in an enabled state, to transmit the data signal DQ, including the command CMD, to the NVM 220, and transmit the address latch enable signal ALE, which is in the enabled state, to transmit the data signal DQ, including the address ADDR, to the NVM 220.

The controller interface circuit 212a may transmit the read enable signal nRE to the NVM 220 through the fifth pin P25. The controller interface circuit 212a may receive the data strobe signal DQS from the NVM 220 or transmit the data strobe signal DQS from the NVM 220 through the sixth pin P26.

In a data DATA output operation of the NVM 220, the controller interface circuit 212a may generate the read enable signal nRE that toggles and transmit the read enable signal nRE to the NVM 220. For example, the controller interface circuit 212a may generate the read enable signal nRE that changes from a static state (e.g., a high level or a low level) to a toggle state before the data DATA is output. Accordingly, the NVM 220 may generate the data strobe signal DQS that toggles based on the read enable signal nRE. The controller interface circuit 212a may receive the data signal DQ, including data DATA, from the NVM 220, together with the data strobe signal DQS that toggles. The controller interface circuit 212a may obtain the data DATA from the data signal DQ on the basis of the toggle timing of the data strobe signal DQS.

In a data DATA input operation of the NVM 220, the controller interface circuit 212a may generate the data strobe signal DQS that toggles. For example, the controller interface circuit 212a may generate the data strobe signal DQS that changes from a static state (e.g., a high level or a low level) to a toggle state before the data DATA is transmitted. The controller interface circuit 212a may transmit the data signal DQ, including the data DATA, to the NVM 220 on the basis of toggle timings of the data strobe signal DQS.

The controller interface circuit 212a may receive the ready/busy output signal nR/B from the NVM 220 through the eighth pin P28. The controller interface circuit 212a may identify state information of the NVM 220 on the basis of the ready/busy output signal nR/B.

Figure 6:
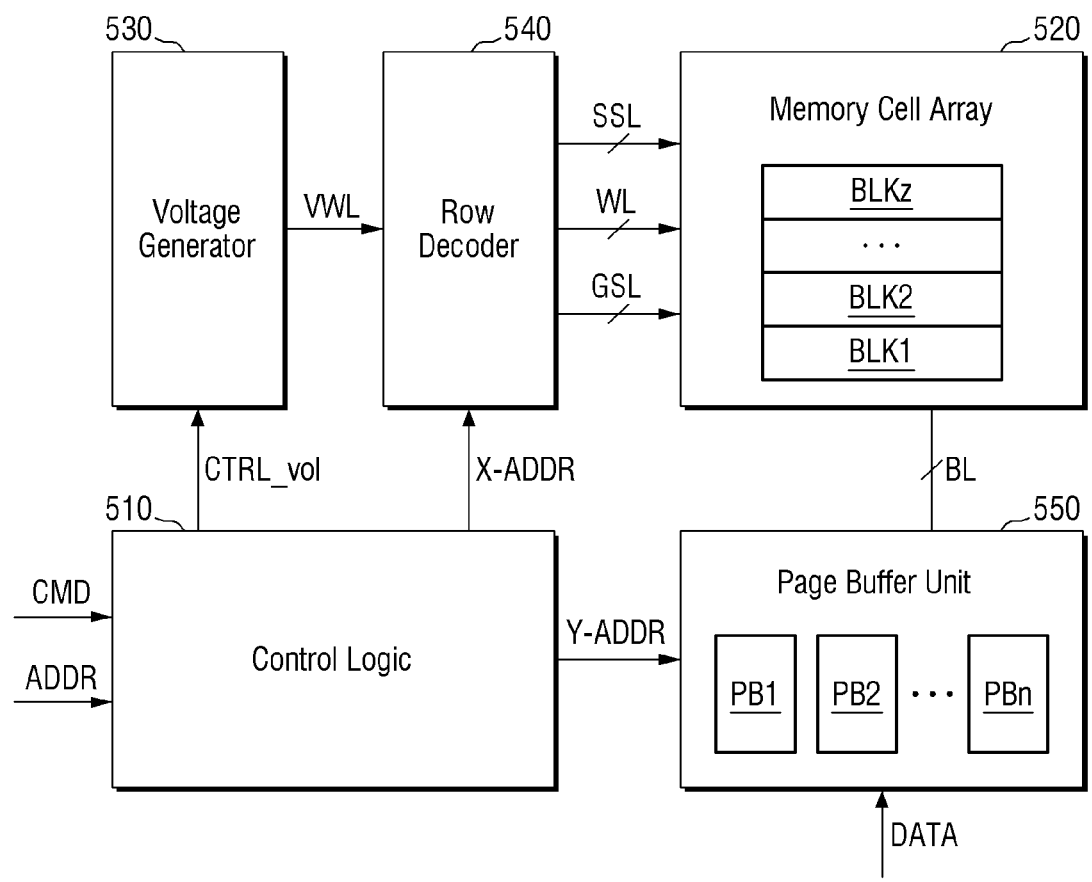
FIG. 6 is a block diagram illustrating an example of the non-volatile memory of FIG. 5 according to an embodiment.

FIG. 6 is a block diagram illustrating an example of the NVM 220 of FIG. 5 according to an embodiment.

Referring to FIG. 6, an NVM 220 may include a control logic circuit 510, a memory cell array 520, a page buffer unit 550, a voltage generator 530, and a row decoder 540. Although not shown in FIG. 6, the NVM 220 may further include the memory interface circuit 212b of FIG. 5, and may further include a column logic, a pre-decoder, a temperature sensor, a command decoder, an address decoder, etc.

The control logic circuit 510 may generally control various operations of the NVM 220. The control logic circuit 510 may output various control signals in response to a command CMD and/or an address ADDR from the memory interface circuit 212b of FIG. 5. For example, the control logic circuit 510 may output a voltage control signal CTRL_vol, a row address X-ADDR, and a column address Y-ADDR.

The memory cell array 520 may include a plurality of memory blocks BLK1 to BLKz (z is a positive integer), and each of the plurality of memory blocks BLK1 to BLKz may include a plurality of memory cells. The memory cell array 520 may be connected to the page buffer unit 550 through bit lines BL and connected to the row decoder 540 through word lines WL, string selection lines SSL, and ground selection lines GSL.

In an embodiment, the memory cell array 520 may include a 3D memory cell array, and the 3D memory cell array may include a plurality of NAND strings. Each of the NAND strings may include memory cells connected to word lines vertically stacked on a substrate. In an embodiment, the memory cell array 520 may include a two-dimensional (2D) memory cell array and the 2D memory cell array may include a plurality of NAND strings arranged in row and column directions.

The page buffer unit 550 may include a plurality of page buffers PB1 to PBn (n is an integer greater than or equal to 3), and the plurality of page buffers PB1 to PBn may be connected to the memory cells through the bit lines BL. The page buffer unit 550 may select at least one of the bit lines BL in response to the column address Y-ADDR. The page buffer unit 550 may function as a write driver or a sense amplifier according to an operating mode. For example, during a program operation, the page buffer unit 550 may apply a bit line voltage corresponding to data to be programmed to a selected bit line. During a read operation, the page buffer unit 550 may sense data stored in a memory cell by sensing a current or voltage of a selected bit line.

The voltage generator 530 may generate various types of voltages for performing the program operation, the read operation, an erase operation, etc. on the basis of the voltage control signal CTRL_vol. For example, the voltage generator 530 may generate a program voltage, a read voltage, a program-verify voltage, an erase voltage, or the like as word line voltages VWL.

The row decoder 540 may select one of the word lines WL and one of the string selection lines SSL in response to the row address X-ADDR. For example, the row decoder 540 may apply the program voltage and the program-verify voltage to a selected word line during the program operation and apply the read voltage to a selected word line during the read operation.

Figure 7:
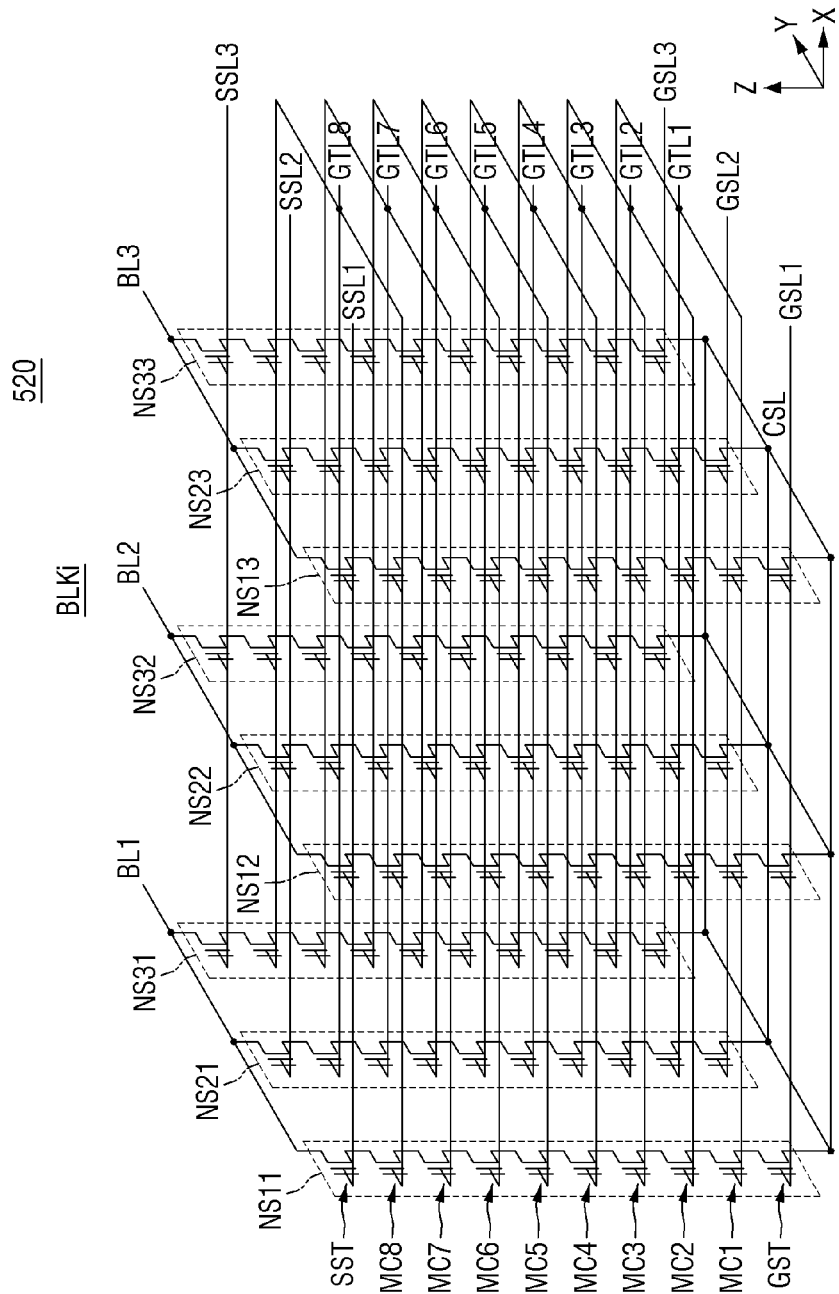
FIG. 7 is a diagram of a three-dimensional (3D) V-NAND structure applicable to a non-volatile memory according to an embodiment.

FIG. 7 is a diagram of a 3D V-NAND structure applicable to a non-volatile memory according to an embodiment. When a storage module of a storage device is embodied as a 3D V-NAND type flash memory, each of a plurality of memory blocks of the storage module may be represented as an equivalent circuit illustrated in FIG. 7.

A memory block BLKi illustrated in FIG. 7 may be a 3D memory block formed in a 3D structure on a substrate. For example, a plurality of memory NAND strings included in the memory block BLKi may be formed in a direction perpendicular to the substrate.

Referring to FIG. 7, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. FIG. 7 illustrates that each of the plurality of memory NAND strings NS11 to NS33 includes eight memory cells MC1, MC2, . . . , MC8 but embodiments are not limited thereto.

The string selection transistor SST may be connected to the respective string selection line SSL1, SSL2, or SSL3 corresponding thereto. The plurality of memory cells MC1, MC2, . . . , MC8 may be connected to corresponding gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., word lines WL1) having the same height may be connected in common, and the ground selection lines GSL1, GSL2, and GSL3 and the string selection lines SSL1, SSL2, and SSL3 may be separated from one another. FIG. 7 illustrates that a memory block BLK is connected to the eight gate lines GTL1 to GTL8 and the three bit lines BL1, BL2, and BL3, but embodiments are not limited thereto.

Figure 8:
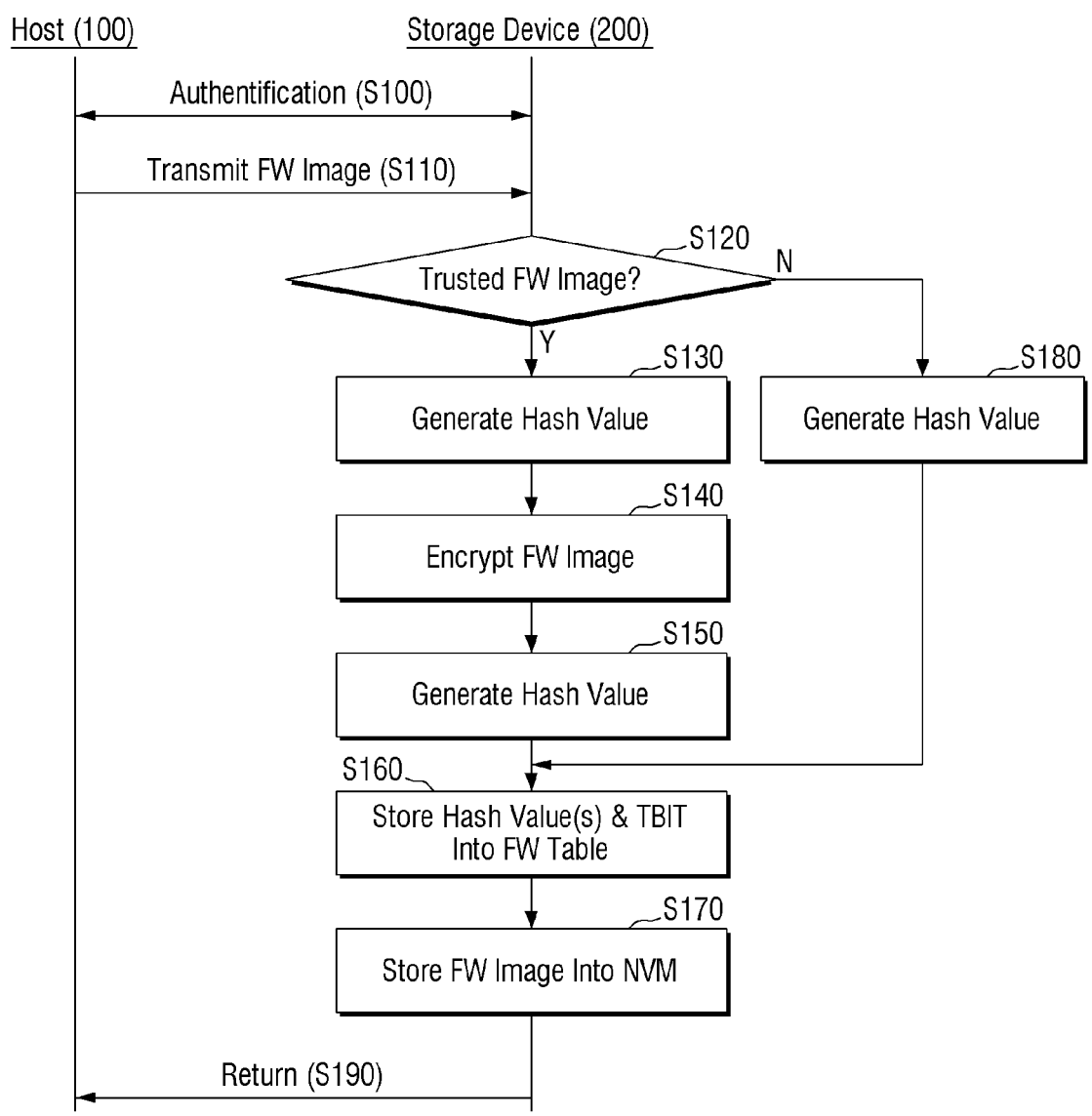
FIG. 8 is a flowchart of an operating method of a storage device according to an embodiment.

FIG. 8 is a flowchart of an operating method of a storage device according to an embodiment.

FIG. 8 is a diagram illustrating an operation of receiving a firmware image from a host device and storing the firmware image in a storage device.

Referring to FIG. 8, in operation S100, authentication may be performed between a host device 100 and a storage controller 210.

The storage controller 210 may authenticate the host device 100 by various authentication methods.

In operation S110, when the authentication succeeds, the storage controller 210 may receive a firmware image from the host device 100. That is, the authenticated host device 100 may transmit the firmware image to the storage controller 210.

In operation S120, the storage controller 210 receiving the firmware image from the host device 100 may check whether the firmware image is a normal firmware image or a trusted firmware image.

In some embodiments, the storage controller 210 may check whether the firmware image is a normal firmware image or a trusted firmware image on the basis of header information of the firmware image from the host device 100 but embodiments are not limited thereto.

When the firmware image from the host device 100 is a trusted firmware image (yes in operation S120), in operation S130, a hash value of the trusted firmware image from the host device 100 may be created. That is, a hash value of the trusted firmware image that is not encrypted may be created.

In operation S140, the trusted firmware image from the host device 100 may be encrypted (S140).

In some embodiments, the firmware manager 214 of the storage controller 210 of FIG. 1 may encrypt the trusted firmware image from the host device 100 using unique information of a storage device such as the PUF or the OTP. Accordingly, the same trusted firmware image may be encrypted differently with respect to storage devices.

In operation S150, a hash value of the encrypted trusted firmware image may be created. That is, a hash value of the encrypted trusted firmware image may be created.

In operation S160, the hash value and an identifier bit may be stored in a firmware table.

Here, because the hash value of the unencrypted trusted firmware image and the hash value of the encrypted trusted firmware image are created, two hash values HASH and EHASH may be stored in the firmware table as shown in FIG. 3.

The firmware image from the host device 100 may be a trusted firmware image and thus an identifier bit TBIT thereof may be set to 1.

In this case, boot priority may be determined according to a predetermined scheme.

In operation S170, the encrypted firmware image may be stored in an NVM.

As a result, the trusted firmware images TF1 to TF3 may be stored in the trusted firmware storage area TFA of the NVM 220 as shown in FIG. 2.

When the firmware image from the host device 100 is a normal firmware image (no in operation S120), in operation S180, a hash value of the normal firmware image from the host device 100 may be created. That is, a hash value of the normal firmware image that is not encrypted may be created.

In an example embodiment, in operation S160, the normal firmware image may not be encrypted and thus the hash value and an identifier bit may be stored in the firmware table.

Here, only the hash value of the unencrypted normal firmware image may be created and thus one hash value HASH may be stored in the firmware table as shown in FIG. 3.

The firmware image from the host device 100 may be a normal firmware image and thus an identifier bit TBIT thereof may be set to 0.

In this case, boot priority may be also determined according to a predetermined scheme.

In operation S170, the encrypted firmware image may be stored in an NVM.

Therefore, the normal firmware images NF1 to NF3 may be stored in the normal firmware storage area NFA of the NVM 220 as shown in FIG. 2.

In operation S190, the storage controller 210 may inform the host device 100 of the completion of the storing of the firmware images.

Figure 9:
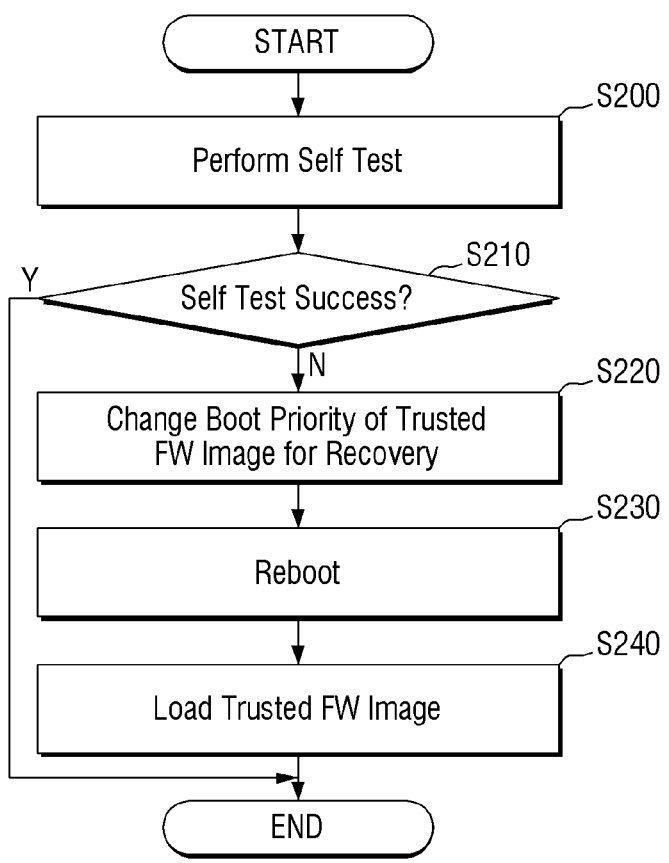
Figure 11:
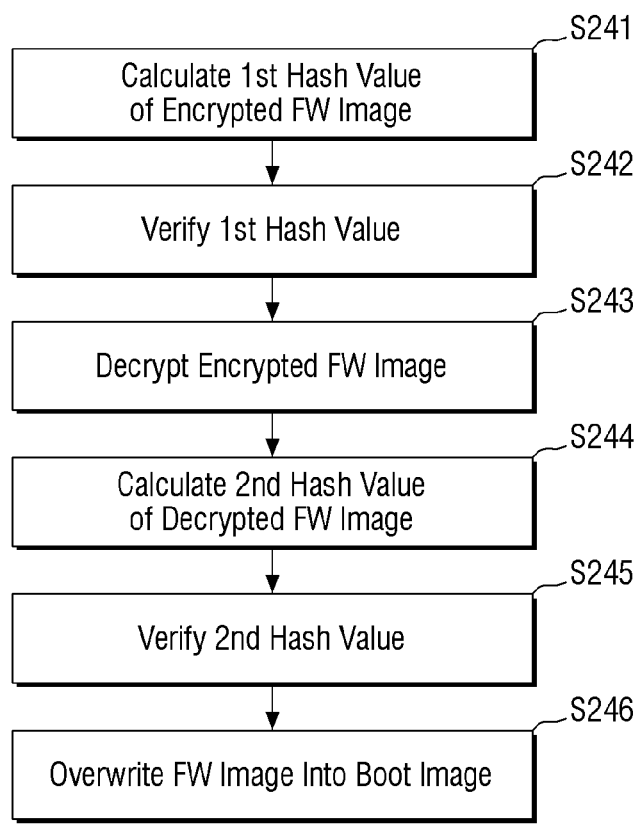

FIGS. 9 to 11 are diagrams of an operating method of a storage device according to some embodiments.

FIGS. 9 to 11 are diagrams illustrating a storage controller of a storage device replacing firmware by performing a self-test for the storage device.

Referring to FIG. 9, in operation S200, a self-test may be performed.

For example, the storage controller may perform the self-test for the storage device. In some embodiments, the self-test may be performed in a predetermined cycle.

In operation S210, it may be checked whether the self-test succeeds.

When the result of the self-test reveals that no error is detected (yes in operation S210), the operation of the storage device may be continuously performed using a current boot image.

When the result of the self-test reveals that an error is detected (no in operation S210), in operation S220, boot priority for a trusted firmware image for fixing the error may be changed.

For example, the trusted firmware image TF1 of FIG. 2 may be a DRAM-less firmware image for operating the storage device 200 without using the buffer memory 216a of FIG. 1.

When the result of the self-test reveals that an error is detected in an operation of the buffer memory 216a, which is a DRAM, of FIG. 1, the storage controller may change boot priority of the normal firmware image NF1, which is being operated, to lower priority and change boot priority of the trusted firmware image TF1 to 1 as shown in FIG. 10, so that the trusted firmware image TF1 may be considered first during rebooting.

For example, the trusted firmware TF1 shown in FIG. 2 may be a software crypto firmware image for operating the storage device 200 while performing an operation of the crypto module 216c of FIG. 1 using software.

When the result of the self-test reveals that an error is detected in the operation of the crypto module 216c of FIG. 1, the storage controller may change boot priority of the normal firmware image NF1, which is being operated, to lower priority and change boot priority of the trusted firmware image TF1 to 1 as shown in FIG. 10, so that the trusted firmware image TF1 may be considered first during rebooting.

In operation S230, the storage device may be rebooted. In operation S240, a trusted firmware image assigned highest boot priority may be loaded.

As shown in FIG. 10, according to the embodiment described above as an example, the boot priority of FW #1 of HASH a1 may be changed from 2 to 1, and the boot priority of FW #1 of HASH d1 is changed from 1 to 2.

Referring to FIG. 11, an operation of loading a firmware image may include a hash value verification operation and a decryption operation.

In operation S241, an encrypted trusted boot image stored in an NVM may be read and a first hash value of the encrypted trusted boot image may be calculated.

In operation S242, the calculated first hash value may be compared with a hash value stored in a firmware table to verify the first hash value.

For example, the calculated first hash value of the encrypted trusted boot image read from the NVM may be compared to a2 shown in FIG. 10 to verify the first hash value.

In operation S243, after the verification, the encrypted trusted boot image may be decrypted.

In some embodiments, the firmware manager 214 of the storage controller 210 of FIG. 1 may decrypt the encrypted trusted firmware image using unique information of the storage device such as the PUF or the OTP.

In operation S244, a second hash value of the decrypted trusted boot image may be calculated.

In operation S245, the calculated second hash value may be compared with a hash value stored in a firmware table to verify the second hash value.

For example, the calculated second hash value of the decrypted trusted boot image may be compared with a1 shown in FIG. 10 to verify the second hash value.

In operation S246, after the verification, the decrypted trusted boot image may be written over a boot image. Therefore, the storage device may be operated on the basis of a trusted firmware image for fixing a detected error.

As described above, even when an error occurs in the storage device according to the present embodiment, the storage device does not need to request a host device to provide a firmware image for fixing the error and stand by until the firmware image for fixing the error is transmitted from the host device. Therefore, the operation reliability of the storage device may be improved.

At least one of the components, elements, modules or units (collectively "components" in this paragraph) represented by a block in the drawings such as FIGS. 1, 2, and 4-6 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although embodiments of the present disclosure have been described above with reference to the accompanying drawings, the present disclosure is not limited thereto and may be embodied in various different forms. It will be understood by those of ordinary skill in the art that the present disclosure may be implemented in other specific forms without departing from the technical spirit or essential features of the present disclosure. Therefore, it should be understood that the embodiments described above are merely examples in all respects and not restrictive.

What is claimed is:

1. A storage device for storing data, comprising:
a non-volatile memory comprising a first area configured to store a plurality of normal firmware images and a second area configured to store a plurality of trusted firmware images;
a firmware table configured to store information about the plurality of normal firmware images and the plurality of trusted firmware images; and
a storage controller configured to:
control the non-volatile memory;
perform a self-test for the storage device; and
write at least one of the plurality of trusted firmware images over a boot image based on a result of the self-test,
wherein the firmware table is configured to store a first hash value calculated before encryption of the plurality of trusted firmware images, and a second hash value calculated after encryption of the plurality of trusted firmware images,
wherein the firmware table is further configured to store boot priority, and
wherein firmware assigned a higher boot priority is executed first in response to the storage device being booted.

2. The storage device of claim 1, wherein the firmware table is further configured to store a third hash value calculated before encryption of the plurality of normal firmware images.

3. The storage device of claim 1, wherein the firmware table is further configured to store information for distinguishing between the plurality of normal firmware images and the plurality of trusted firmware images.

4. The storage device of claim 1, wherein the storage controller is configured to change the boot priority in the firmware table based on the result of the self-test.

5. The storage device of claim 1, wherein, based on the result of the self-test indicating that an error is detected, the storage controller is further configured to:
load an encrypted first trusted firmware image, among the plurality of trusted firmware images from the non-volatile memory, for fixing the error;
perform a first verification to determine whether a calculated third hash value of the encrypted first trusted firmware image is the same as the first hash value;
decrypt the encrypted first trusted firmware image based on the first verification succeeding;
perform a second verification to determine whether a calculated fourth hash value of the decrypted first trusted firmware image is the same as the second hash value; and
write the decrypted first trusted firmware image over the boot image based on the second verification succeeding.

6. The storage device of claim 5, wherein the storage controller is further configured to decrypt the encrypted first trusted firmware image based on unique information of the storage device.

7. The storage device of claim 1, wherein the storage controller is further configured to:
receive a firmware image from an authenticated host device;
calculate a fifth hash value of the received firmware image based on the received firmware image being a normal firmware image;
store the fifth hash value in the firmware table; and
store the normal firmware image in the first area of the non-volatile memory.

8. The storage device of claim 7, wherein the storage controller is further configured to:
calculate a sixth hash value of the received firmware image based on the received firmware image being a trusted firmware image;
encrypt the trusted firmware image;
calculate a seventh hash value of the encrypted trusted firmware image;
store the sixth hash value and the seventh hash value in the firmware table; and
store the encrypted trusted firmware image in the second area of the non-volatile memory.

9. An operating method of a storage device, comprising:
providing a firmware table storing boot priority, a first hash value, and a second hash value for a plurality of trusted firmware images;
performing a self-test for the storage device;
based on a result of the self-test indicating that an error is detected, changing a boot priority of a first trusted firmware image, among the plurality of trusted firmware images, for fixing the error;
loading the first trusted firmware image stored in a non-volatile memory, the first trusted firmware image being encrypted;
performing a first verification to determine whether a calculated third hash value of the encrypted first trusted firmware image is the same as the first hash value;
decrypting the encrypted first trusted firmware image based on the first verification succeeding;
performing a second verification to determine whether a calculated fourth hash value of the decrypted first trusted firmware image is the same as the second hash value; and
writing the decrypted first trusted firmware image over a boot image based on the second verification succeeding.

10. The operating method of claim 9, wherein the decrypting of the encrypted first trusted firmware image comprises decrypting the encrypted first trusted firmware image using unique information of the storage device.

11. The operating method of claim 9, wherein the storage device is configured to store a plurality of normal firmware images, and
wherein the firmware table is configured to store a hash value of each of a plurality of unencrypted normal firmware images and is configured to not store a hash value of each of a plurality of encrypted normal firmware images.

12. The operating method of claim 11, wherein the firmware table is further configured to store information for distinguishing between the plurality of normal firmware images and the plurality of trusted firmware images.

13. The operating method of claim 9, further comprising:
receiving a firmware image from an authenticated host device;

calculating a third hash value of the received firmware image based on the received firmware image being a trusted firmware image;
encrypting the trusted firmware image;
calculating a fourth hash value of the encrypted trusted firmware image;
storing the third hash value as the first hash value in the firmware table; and
storing the fourth hash value as the second hash value in the firmware table.

14. The operating method of claim 13, further comprising, based on the received firmware image being a normal firmware image:
calculating a fifth hash value of the received firmware image; and
storing the fifth hash value in the firmware table.

15. An operating method of a storage device, comprising:
authenticating a host device;
receiving a firmware image from the host device based on the authentication of the host device succeeding;
identifying whether the received firmware image is a normal firmware image or a trusted firmware image;
based on the received firmware image being a normal firmware image:
calculating a first hash value of the received firmware image,
storing the first hash value in a firmware table, and
storing the normal firmware image in a non-volatile memory;
based on the received firmware image being a trusted firmware image:
calculating a second hash value of the received firmware image,
encrypting the trusted firmware image,
calculating a third hash value of the encrypted trusted firmware image,
storing the second hash value and the third hash value in the firmware table, and
storing the encrypted trusted firmware image in the non-volatile memory,
performing a self-test for the storage device;
based on a result of the self-test indicating that an error is detected, loading the encrypted trusted firmware image for fixing the error from the non-volatile memory;
performing a first verification to determine whether a calculated fourth hash value of the encrypted trusted firmware image is the same as the third hash value.

16. The operating method of claim 15, wherein the encrypting of the trusted firmware image comprises encrypting the encrypted trusted firmware image using unique information of the storage device.

17. The operating method of claim 15, further comprising:
decrypting the encrypted trusted firmware image based on the first verification succeeding;
performing a second verification to determine whether a calculated fifth hash value of the decrypted trusted firmware image is the same as the second hash value; and
writing the decrypted trusted firmware image over a boot image based on the second verification succeeding.

18. The operating method of claim 17, further comprising, based on the result of the self-test indicating that an error is detected, changing, in the firmware table, a boot priority of the encrypted trusted firmware image for fixing the error.

19. The operating method of claim 15, wherein the firmware table is configured to store information for distinguishing between the normal firmware image and the trusted firmware image.

* * * * *